United States Patent
Tateishi

[11] Patent Number: 6,057,675
[45] Date of Patent: *May 2, 2000

[54] DC/DC CONVERTER

[75] Inventor: Tetsuo Tateishi, Aichi, Japan

[73] Assignee: Kabushiki Kaisha Toyoda Jidoshokki Seisakusho, Kariya, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/306,285

[22] Filed: May 6, 1999

[30] Foreign Application Priority Data

May 11, 1998 [JP] Japan .................................. 10-127082

[51] Int. Cl.[7] .............................. G05F 1/56; G05F 1/618
[52] U.S. Cl. .......................... 323/283; 323/225; 323/288
[58] Field of Search ..................................... 323/225, 271, 323/282, 283, 284, 285, 286, 288, 290, 351

[56] References Cited

U.S. PATENT DOCUMENTS

| | | | |
|---|---|---|---|
| 5,627,460 | 5/1997 | Bazinet et al. ........................... | 323/288 |
| 5,705,919 | 1/1998 | Wilcox ..................................... | 323/282 |
| 5,777,461 | 7/1998 | Massie et al. ........................... | 323/282 |
| 5,814,979 | 9/1998 | Grimm .................................... | 323/284 |
| 5,955,872 | 9/1999 | Grimm .................................... | 323/283 |

FOREIGN PATENT DOCUMENTS

8-3318383  6/1995  Japan .

*Primary Examiner*—Y. J. Han
*Attorney, Agent, or Firm*—Woodcock Washburn Kurtz Mackiewicz & Norris LLP

[57] ABSTRACT

A feedback amplifier generates a control signal based on an output voltage and a reference voltage. A first ramp signal generating circuit generates a first ramp signal that synchronizes with a pulse signal from an oscillator. A second ramp signal generating circuit generates a second ramp signal according to the state of a latch circuit. A comparator generates a reset signal when the total of the signal representing an inductor current and the respective levels of the first and the second ramp signals becomes higher than the level of the control signal. The latch circuit is set by the pulse signal from the oscillator and is reset by the reset signal. A driver circuit comprises a boost capacitor, and drives the switch according to the state of the latch circuit.

14 Claims, 11 Drawing Sheets

DC/DC CONVERTER

BACKGROUND OF THE INVENTION

1. Field of the Invention

The present invention relates to a DC/DC converter, and more particularly to a DC/DC converter with which a stable output voltage can be obtained even when a difference between a supplied input voltage and an output voltage to be kept is small.

2. Description of the Related Art

A DC/DC converter (switching regulator) is a device for generating a predetermined output voltage from a supplied input voltage, and is mounted on various electric apparatus. Especially, an enormous number of DC/DC converters has been manufactured and marketed in recent years with the popularization of electronic devices of portable types.

Figure 1:
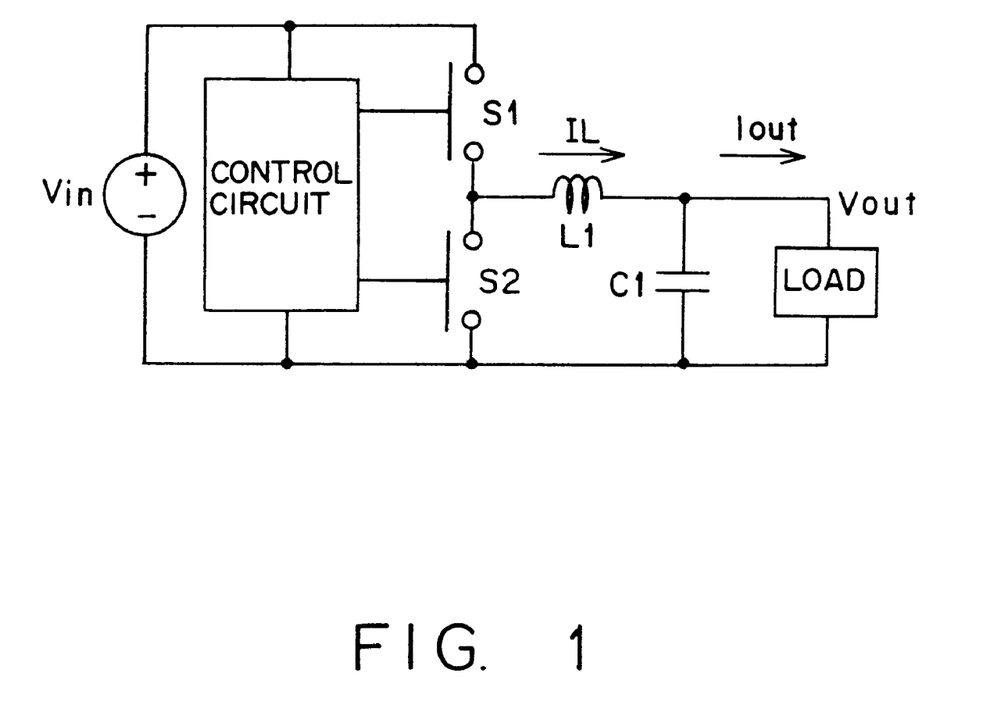
FIG. 1 is a circuit diagram showing the fundamental configuration of a typical DC/DC converter.

FIG. 1 shows the basic configuration of a typical DC/DC converter. This DC/DC converter keeps an output voltage $V_{out}$ at a desired value by alternately closing (turning on) switches S1 and S2 at suitable timing. An input voltage $V_{in}$, the output voltage $V_{out}$, and a duty (duty cycle) D of the switch S1 (a ratio of time period in which the switch S1 is held ON to a switching cycle) fundamentally have the following relationship when the DC/DC converter is in a stable state.

$$D = V_{out}/V_{in}$$

Figure 2:
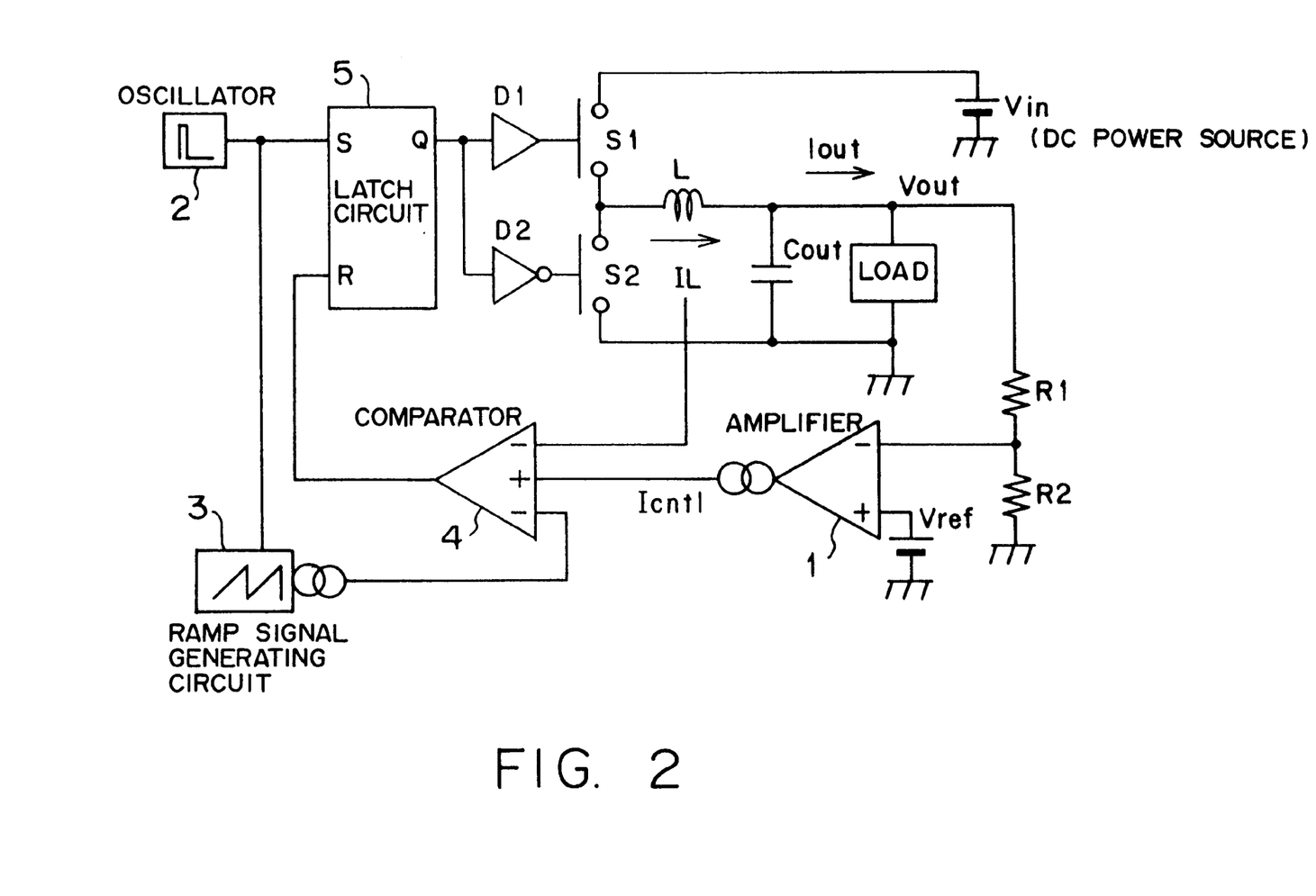
FIG. 2 is a circuit diagram exemplifying a conventional DC/DC converter that accompanies an electric current control.

FIG. 2 is a circuit diagram exemplifying a conventional DC/DC converter that accompanies a peak current control. A feedback amplifier (error amplifier) 1 generates a control signal $I_{cntl}$ for controlling the electric current flowing into an inductor L based on a difference between a voltage obtained by dividing an output voltage $V_{out}$ with resistors R1 and R2 and a reference voltage $V_{ref}$. The level of the control signal $I_{cntl}$ rises with the decrease of the output voltage $V_{out}$, and falls with the increase of the output voltage $V_{out}$.

An oscillator 2 generates a pulse signal of a predetermined cycle. A ramp signal generating circuit 3 generates a ramp signal which is synchronous with the pulse signal output from the oscillator 2. Here, the ramp signal is a signal including a time period during which a voltage approximately linearly increases as time elapses. The ramp signal is used to stabilize the operations of the DC/DC converter. Details of the technique that utilizes a ramp signal in order to stabilize the operations of a DC/DC converter are disclosed, for example, by "On the Characteristics of DC-to-DC Converters Operating in Current Programmed Mode" written by K. Harada, et al. (the Telecommunications Society Paper, April '86, Vol.J69-C No. 4)

A comparator 4 generates a signal for resetting a latch circuit 5 based on the current signal IL representing an electric current flowing through the inductor L, the control signal $I_{cntl}$ generated by the feedback amplifier 1, and the ramp signal generated by the ramp signal generating circuit 3. Specifically, the comparator 4 generates the reset signal if the total of the current signal IL and the ramp signal is larger than the control signal $I_{cntl}$.

The latch circuit 5 is set on the rising edge (or falling edge) of the pulse signal output from the oscillator 2, and is reset by the reset signal output from the comparator 4. When the latch circuit 5 is in a set state, the switches S1 and S2 are respectively held ON and OFF. In this state, the electric current from a DC power source toward a load flows via the switch S1 and the inductor L. The inductor current increases as time elapses.

If the inductor current increases and the total of the current signal IL and the ramp signal becomes larger than the control signal $I_{cntl}$, the latch circuit 5 is reset. When the latch circuit 5 is in a reset state, the switches S1 and S2 are respectively held OFF and ON. In this state, the inductor current flows via the switch S2, and decreases with time. Thereafter, when the rising edge of the pulse signal from the oscillator 2 is input to the latch circuit 5, the latch circuit 5 is again set and the above described process is repeated.

In the above described operations, the control signal $I_{cntl}$ is controlled by the output voltage $V_{out}$, which is kept under the feedback control at the voltage corresponding to the reference voltage $V_{ref}$.

In the above described configuration, the switches S1 and S2 are normally implemented by semiconductor elements. Especially, a semiconductor switching element such as a MOS transistor, etc. is used as the switch S1. An n-type element (for example, an nMOS transistor) is desirable in consideration of the conditions such as low cost and less ON-resistance as the semiconductor switching element. However, the n-type semiconductor switching element requires a voltage which is higher than a power supply voltage $V_{in}$ when being driven.

Figure 3:
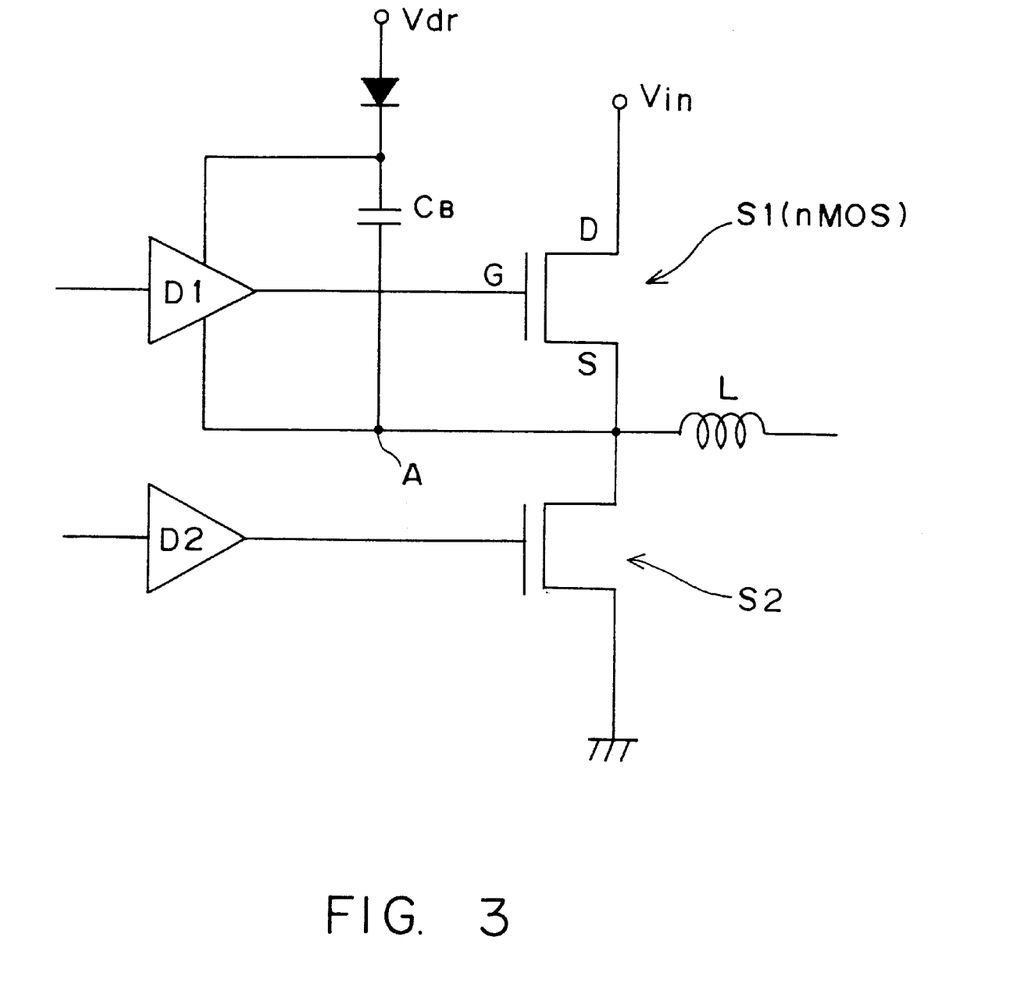
FIG. 3 is a circuit diagram explaining a circuit for applying a voltage higher than an input voltage to a semiconductor switching element of an n-type.

FIG. 3 is a circuit diagram for explaining the circuit where a voltage higher than an input voltage is applied to the n-type semiconductor switching element. Here, the explanation will be provided by citing the switches S1 and S2, which are shown in FIG. 2, and their peripheral circuits as an example, and by assuming that the switch S1 is an nMOS transistor.

When the switch S1 is in an ON state (the state where the MOS transistor is ON), its drain-source is substantially short circuit. To turn on the switch S1, a voltage higher than a predetermined threshold voltage must be applied to between a gate and the source. That is, a voltage higher than the input voltage $V_{in}$ must be generated to turn on the switch S1. In this circuit, a voltage higher than the input voltage $V_{in}$ is generated by a boost capacitor CB, which is charged when the voltage of a node A sufficiently drops. Namely, the boost capacitor CB is charged when the switch S1 is OFF (the MOS transistor is turned off) and at the same time, the switch S2 is ON.

The input voltage $V_{in}$ supplied to the DC/DC converter may sometimes vary, especially when its power source is a battery. The DC/DC converter must keep the output voltage $V_{out}$ constant even in such a case. Accordingly, when the input voltage $V_{in}$ goes down, the process for increasing the duty D is performed according to the above described equation (1). That is, the ratio of time period in which the switch S1 is ON is increased.

As described above, however, the boost capacitor CB shown in FIG. 3 is charged when the switch S1 is OFF. Accordingly, if the duty D exceeds an upper limit, the boost capacitor CB cannot be fully charged, which leads to the disability of holding the switch S1 ON. This problem arises because a finite amount of time is required for a switching time, and a pulse width shorter than the switching cannot be generated. Accordingly, among existing DC/DC converters, a converter which regulates the maximum value of the duty D in order to fully charge the boost capacitor CB is known.

If the maximum value of the duty D is regulated, the relationship between the input voltage $V_{in}$ and the output voltage $V_{out}$ becomes as follows.

$$V_{out} \leq V_{in} \cdot D_{max}$$

Namely, if the maximum value of the duty D is regulated, a predetermined output voltage $V_{out}$ is difficult to be held when the input voltage $V_{in}$ goes down.

SUMMARY OF THE INVENTION

An object of the present invention is to provide a DC/DC converter that can keep an output voltage even if the difference between a supplied input voltage and the output voltage to be kept is small.

The DC/DC converter according to the present invention assumes the configuration where a switch and an inductor connected thereto are included, and a predetermined output voltage is generated from a supplied input voltage. This DC/DC converter comprises: a control signal generating circuit which generates a control signal based on the difference between an output voltage or a voltage proportional to the output voltage and a reference voltage; a detecting circuit which detects an inductor current flowing through the inductor; an oscillator which generates a signal of a predetermined cycle; a first comparing signal generating circuit which generates a first comparing signal that is synchronous with the signal of the predetermined cycle; a latch circuit which selectively holds either of a set state and a reset state; a driving circuit which drives the switch based on the state held by the latch circuit; a capacitor which stores an electric charge used when the driving circuit holds the switch ON; a second comparing signal generating circuit which generates a second comparing signal based on the state held by the latch circuit; and a reset signal generating circuit which generates a reset signal based on the control signal, the inductor current, the first comparing signal, and the second comparing signal. The latch circuit is set by the signal of the predetermined cycle, and is reset by the reset signal.

In the above described configuration, the switch is driven based on the state held by the latch circuit. The latch circuit is set by the signal of the predetermined cycle, and is reset by the reset signal. Accordingly, once the above described switch is set by the signal of the predetermined cycle, it can be held ON until the reset signal is generated.

If the difference between an input voltage and an output voltage becomes smaller, the speed at which the inductor current changes slows down. As a result, the time period required from when the switch is turned on till when the reset signal is generated becomes longer. Additionally, the reset signal is generated depending on the second comparing signal that is a signal almost linearly rising with time. Accordingly, if the second comparing signal is set so as to moderately rise with time, the time period from when the switch is turned on till when the reset signal is generated becomes longer. If the time period until the reset signal is generated becomes longer as described above, the time ratio in which the switch is held ON increases. If the time ratio of the switch increases, a predetermined output voltage can be generated with a lower input voltage.

DESCRIPTION OF THE PREFERRED EMBODIMENT

Provided below is the explanation about a preferred embodiment according to the present invention.

Figure 4:
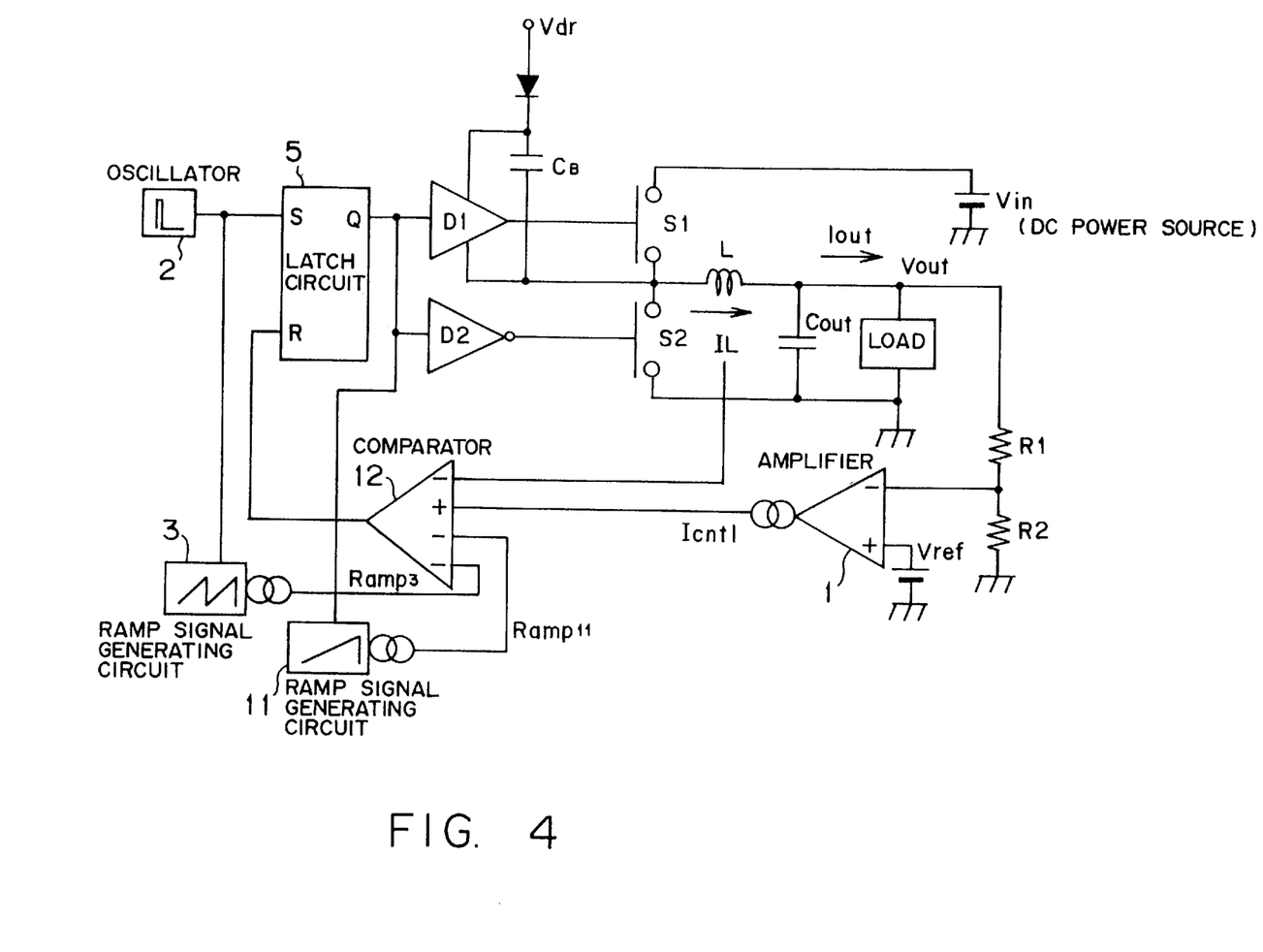
FIG. 4 is a circuit diagram showing the configuration of a DC/DC converter according to a preferred embodiment of the present invention.

FIG. 4 is a circuit diagram showing a DC/DC converter according to the preferred embodiment. In this figure, the same reference numerals as those of FIG. 4 denote the same constituent elements. That is, a feedback amplifier (error amplifier) 1, an oscillator 2, a ramp signal generating circuit 3, a latch circuit 5, drivers D1 and D2, switches S1 and S2, an inductor L, and an output capacitor $C_{out}$, which are shown in FIG. 4, are fundamentally the same as those included by the conventional DC/DC converter shown in FIG. 2.

The switches S1 and S2 are respectively semiconductor switching elements. Here, nMOS transistors are used. A semiconductor element of an n-type has less ON-resistance and requires less cost than a semiconductor element of a p-type. Additionally, a MOS transistor is superior in a response speed.

The driver D1 for driving the switch S1 includes a boost capacitor CB. The boost capacitor CB is charged when the switch S1 is OFF (when the MOS transistor is turned off) and the switch S2 is ON (when the MOS transistor is turned on), as explained by referring to FIG. 3. On the contrary, the boost capacitor CB is discharged when the driver D1 holds the switch S1 ON. Namely, the driver D1 generates an electric potential higher than an input voltage $V_{in}$ by using the electric charge stored in the boost capacitor CB.

A ramp signal generating circuit 11 generates a ramp signal in a similar manner as in the ramp signal generating circuit 3. Note that the ramp signal generating circuit 3 generates a ramp signal of a predetermined cycle according to the pulse signal output from the oscillator 2, while the ramp signal generating circuit 11 is reset when a Q-output of the latch circuit 5 is L, that is, when the latch circuit 5 is reset. Therefore, the cycle of the ramp signal generated by the ramp signal generating circuit 11 may not always be regular.

Figure 5A:
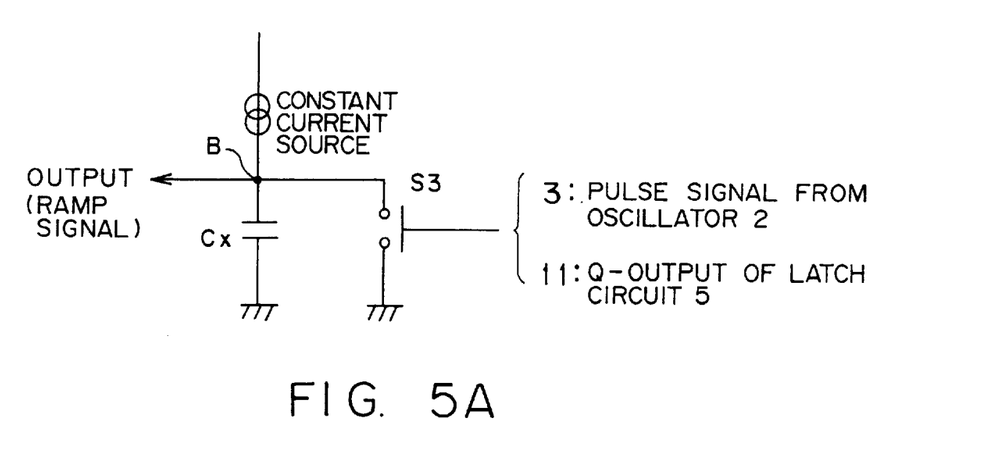
FIG. 5A shows an example of a ramp signal generating circuit.

FIG. 5A shows an example of a ramp signal generating circuit. The ramp signal generating circuits 3 and 11 are fundamentally implemented by the same circuit. Remember that, however, the control signals for controlling the switch S3 are different from each other in this case. The control signal for the ramp signal generating circuit 3 is a pulse signal from the oscillator 2, while the control signal for the ramp signal generating circuit 11 is an output of the latch circuit 5.

The output of the ramp signal generating circuit is the electric potential of a node B shown in FIG. 5A. The electric potential of the node B varies as follows. A capacitor $C_x$ is charged by a constant current source while the switch S3 is in an OFF state. Accordingly, during this time period, the electric potential of the node B almost linearly rises as time elapses. This is what is called a ramp-up. When the switch S3 is ON, the capacitor $C_x$ is discharged. If the resistance of the path reaching from the node B to a ground via the switch S3 is 0 at this time, the electric potential of the node B is immediately dropped to the ground level when the switch S3 is ON. If the path has a certain resistance, the electric potential of the node B almost linearly drops to the ground level at the speed depending on the resistance value of the path as time elapses, after the switch S3 is turned from the OFF state to the ON state.

Figure 5B:
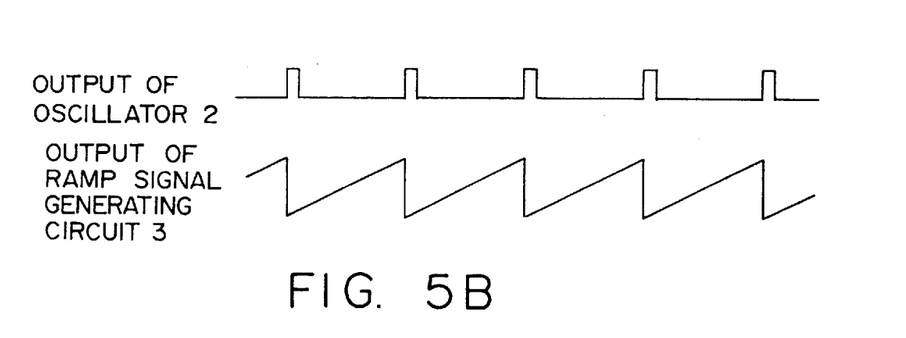
FIGS. 5B and 5C show an input and an output of the ramp signal generating circuit.
Figure 5C:
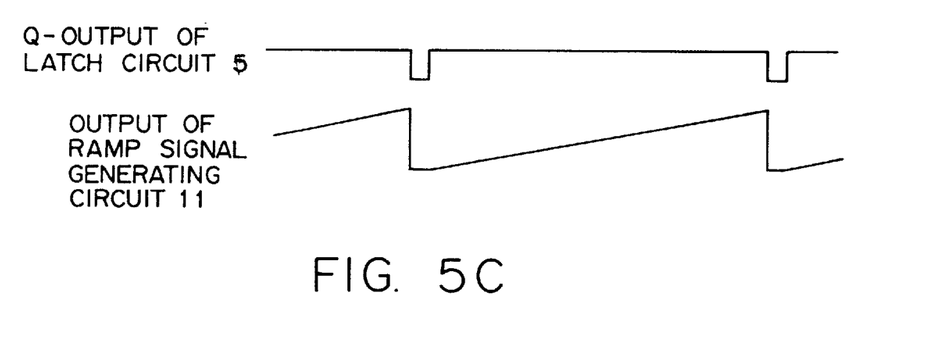

FIGS. 5B and 5C respectively show the inputs and the outputs of the ramp signal generating circuits 3 and 11. The output of the ramp signal generating circuit 3 is dropped to the ground level, for example, when the pulse from the oscillator 2 is input. The output rises at the speed determined according to the current value generated by the constant current source and the capacity of the capacitor $C_x$, until the next pulse is input. Thereafter, the ramp signal generating circuit 3 repeatedly generates and outputs this waveform.

The phenomenon that the signal level linearly or almost linearly rises with time is called a ramp-up. The ramp signal in this preferred embodiment indicates the signal accompanying the ramp-up.

The output of the ramp signal generating circuit 11 is dropped to the ground level when the Q-output of the latch circuit 5 goes to L. The output of the ramp signal generating circuit 11 ramps up at the speed determined according to the current value generated by the constant current source and the capacity of the capacitor $C_x$, while the Q-output of the latch circuit 5 remains to be H. The ramp signal generating circuit 11 repeats these operations.

Turning back to FIG. 4. A comparator 12 generates the signal for resetting the latch circuit 5 based on the inductor signal IL representing an inductor current, the control signal $I_{cntl}$ generated by the feedback amplifier 1, a ramp signal Ramp3 generated by the ramp signal generating circuit 3, and a ramp signal Ramp11 generated by the ramp signal generating circuit 11. Specifically, the comparator 12 generates a reset pulse when the total of the current signal IL, the ramp signal Ramp3, and the ramp signal Ramp 11 becomes larger than the control signal $I_{cntl}$.

Figure 6:
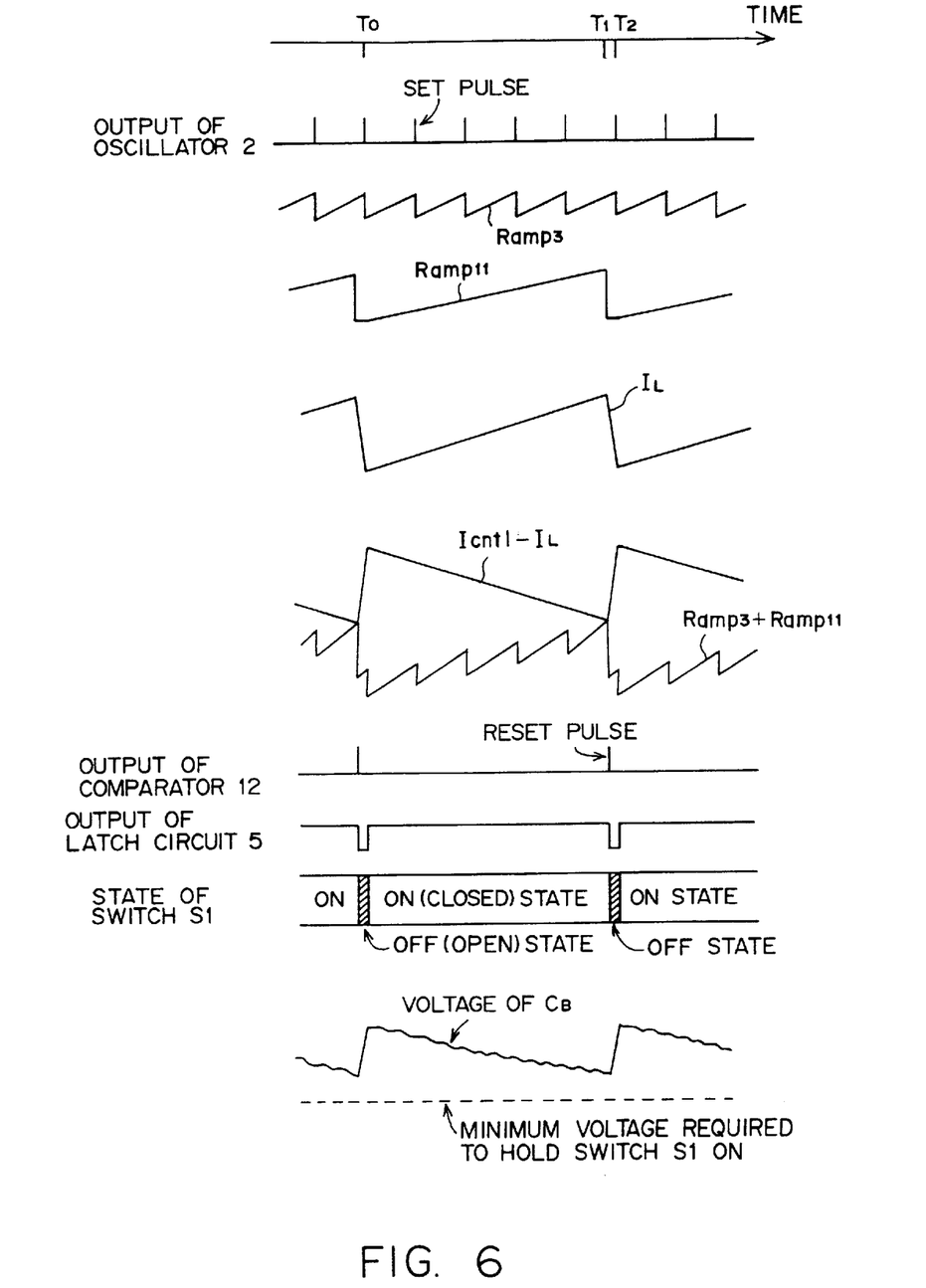
FIG. 6 explains the operations of the DC/DC converter according to the preferred embodiment.

Provided next is the explanation about the operations of the DC/DC converter having the above described configuration, by referring to FIG. 6. Here, assume that the difference between the input voltage $V_{in}$ and the output voltage $V_{out}$ is small, and the inductor current IL moderately ramps up while the switch S1 is in an ON state. As is well known, the ramp-up speed (slope) of an inductor current is represented by the following equation.

$$\text{slope} = (V_{in} - V_{out})/L$$

Provided next is the explanation about the operations after the latch circuit 5 is set by the pulse (hereinafter referred to as a set pulse) output from the oscillator 2 at a time T0, which leads to the transition of the switch S1 from the OFF to the ON state. The oscillation frequency of the oscillator 2 is, for example, on the order of several hundreds of kHz. In this case, the set pulse is generated every several $\mu$ seconds. Note that this frequency is the fundamental switching frequency of the DC/DC converter.

The ramp signal generating circuit 3 generates the ramp signal Ramp3 that is synchronous with the set pulse. Namely, this ramp signal Ramp3 is a signal whose level is dropped to the ground level when the set pulse is input, and ramps up at a predetermined speed within a time period from a certain set pulse till the next set pulse.

The ramp signal Ramp11 generated by the ramp signal generating circuit 11 ramps up while the Q-output of the latch circuit 5 remains to be H. Remember that the Q-output of the latch circuit 5 is driven to L within a time period from when the latch circuit 5 is reset by the output of the comparator 12 till when the next set pulse is input.

As is well known as the operations of a normal switching regulator, the inductor current linearly increases while the switch S1 is in an ON state, and linearly decreases while the switch S2 is in the ON state. Accordingly, since the switch S1 is in the ON state at and after the time T0, the current signal IL ramps up.

The comparator 12 generates a reset pulse when the total of the electric current signal IL, the ramp signal Ramp3, and the ramp signal Ramp11 becomes larger than the control signal $I_{cntl}$, as described above. For ease of explanation, however, FIG. 6 illustrates the configuration where the comparator 12 generates a reset pulse when the comparison between "control signal $I_{cntl}$–electric signal IL" and "ramp signal Ramp3+ramp signal Ramp11" is made, and when the latter becomes larger than the former. Here, it is assumed that the output voltage $V_{out}$ is stable and the control signal $I_{cntl}$ holds a constant value.

"control signal $I_{cntl}$–current signal IL" ramps down at and after the time T0 as the current signal IL rises. For the waveform of "ramp signal Ramp3+ramp signal Ramp11", its peak value increases at and after the time T0 with the rising of the ramp signal Ramp11. Therefore, the difference between these two values gradually becomes smaller as time elapses. Then, "ramp signal Ramp3+ramp signal Ramp11" becomes larger than "control signal $I_{cntl}$–current signal IL" at a time T1. When such a state is detected, the comparator 12 outputs H. Namely, the comparator 12 outputs a reset pulse to the latch circuit 5.

Upon receipt of the reset pulse, the latch circuit 5 drives its Q-output to L until receiving the set pulse from the oscillator 2 at a time T2. When the Q-output of the latch circuit 5 becomes L, the driver D1 holds the switch S1 OFF, while the driver D2 holds the switch S2 ON. Additionally, when the Q-output of the latch circuit 5 becomes L, the ramp signal generating circuit 11 is reset, while the ramp signal Ramp11 drops to the ground level.

Thereafter, when the set pulse is detected from the oscillator 2, the Q-output of the latch circuit 5 is restored to H. When the Q-output of the latch circuit 5 becomes H, the driver D1 holds the switch S1 ON, while the driver D2 holds the switch S2 OFF. The subsequent operations are the same as those performed at the times T0 through T2.

With the above described operations, the switch S1 is held ON between the times T0 and T1, and held OFF between the times T1 and T2. Namely, the time period during which the switch S1 is in the ON state becomes much longer than the time period during which the switch S1 is in the OFF state. In consequence, a very large duty can be obtained.

Provided next is the explanation about the state where the duty of the switch S1 automatically becomes larger when the difference between a supplied input voltage $V_{in}$ and an output voltage $V_{out}$ to be kept becomes smaller, in contrast to the case where this difference is large.

Figure 7:
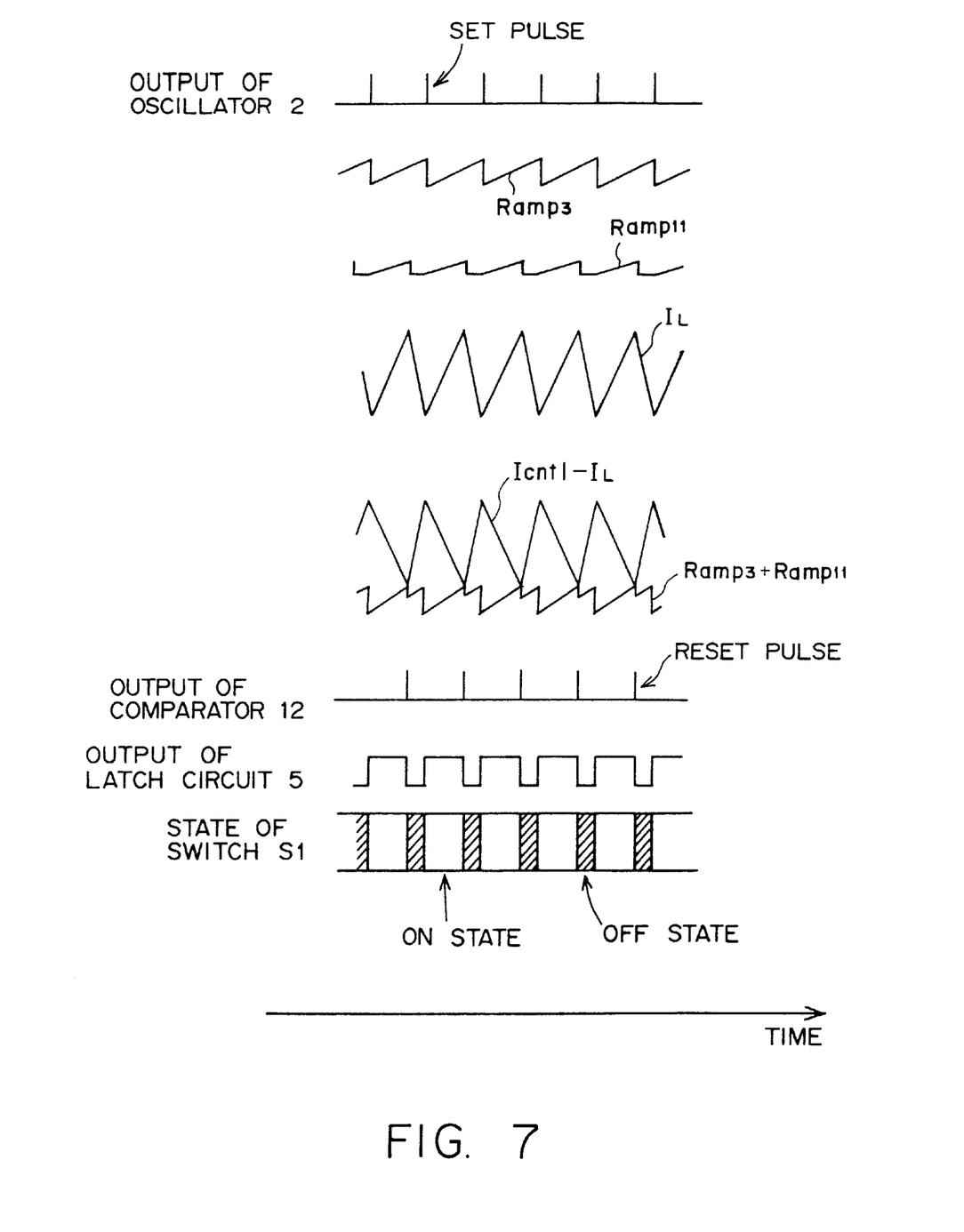
FIG. 7 explains the operations performed when a difference between an input voltage and an output voltage is large.

If the difference between the supplied input voltage $V_{in}$ and the output voltage $V_{out}$ to be kept is large as shown in FIG. 7, the speed at which an inductor current increases is rapid while the switch S1 is ON. Therefore, "control signal $I_{cntl}$–current signal IL" rapidly goes down. In the meantime, the ramp signals Ramp3 and Ramp11 do not fundamentally depend on an input voltage. Accordingly, if the difference between the supplied input voltage $V_{in}$ and the output voltage to be kept becomes larger, the time period from when the set pulse is detected till when "ramp signal Ramp3+ramp signal Ramp11" becomes larger than "control signal $I_{cntl}$–current signal IL", is shortened. When "ramp signal Ramp3+ramp signal Ramp11" becomes larger than "control signal $I_{cntl}$–control signal IL", the reset pulse is generated and the switch S1 is held OFF until the next set pulse is generated, as described above.

In the example shown in FIG. 7, the reset pulse is generated between each set pulse and the next set pulse. Namely, there is the time period during which the switch S1 is OFF for each set pulse. This state is the fundamental operation state of the DC/DC converter.

In the meantime, in the state shown in FIG. 6, one or more set pulses are generated within the time period from when the set pulse is generated at the time T0 till when the reset pulse is generated at the time T1. That is, the time period during which the switch S1 is OFF exists only once for a plurality of set pulses. As described above, the DC/DC converter according to this preferred embodiment does not generate the signal for turning off the switch S1 if the difference between a supplied input voltage $V_{in}$ and an output voltage to be kept is small, thereby increasing its duty.

Figure 8:
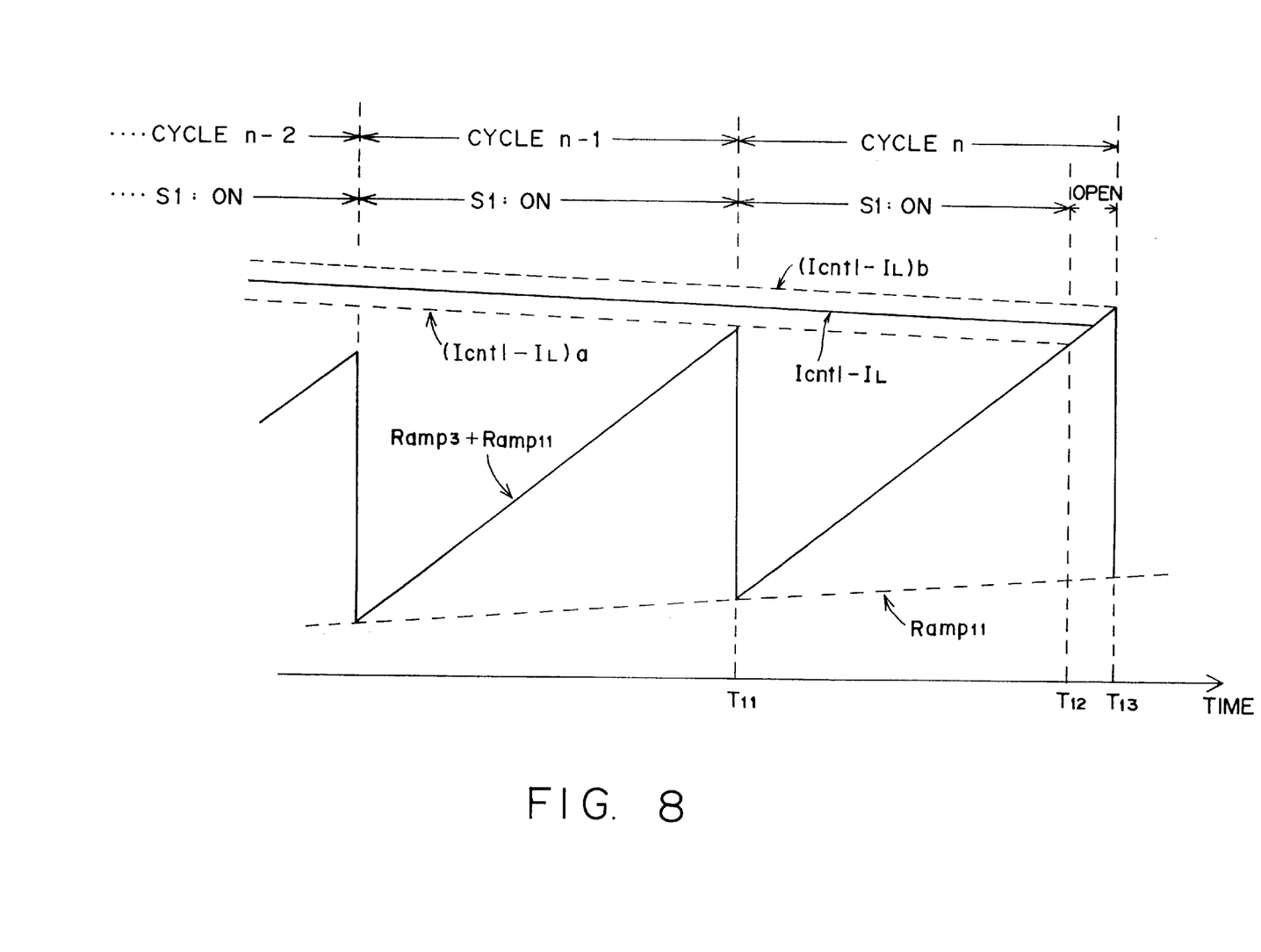
FIG. 8 explains the configuration where a large duty can be obtained with the DC/DC converter according to the preferred embodiment.

FIG. 8 is a schematic diagram explaining that a large duty can be obtained with the DC/DC converter according to this preferred embodiment.

The slope at the time of the ramp-up of the ramp signal Ramp11 generated by the ramp signal generating circuit 11 is smaller than that of the ramp signal Ramp3 generated by the ramp signal generating circuit 3. If the ramp signal generating circuits are implemented by the configuration shown in FIG. 5A, these slopes can be set to desired values depending on the capacity of the capacitor $C_x$ and a constant current provided to the capacitor $C_x$. Additionally, if the difference between a supplied input voltage $V_{in}$ and an output voltage to be kept is small, an inductor current moderately increases. Therefore, the slope of "control signal $I_{cntl}$–current signal IL" is small. Accordingly, the timing at which "ramp signal Ramp3+ramp signal Ramp11" becomes larger than "control signal $I_{cntl}$–current signal IL" occurs immediately before the termination of the cycle of the ramp signal generating circuit 3. The reason why the above described timing occurs immediately before the termination of the cycle will be explained below.

To generate a reset pulse on an nth cycle (times between T11 and T13) of the ramp signal generating circuit 3, "control signal $I_{cntl}$–current signal IL" must be a level between "(control signal $I_{cntl}$–current signal IL)a" and "(control signal $I_{cntl}$–current signal IL)b", as shown in FIG. 8. Namely, if "control signal $I_{cntl}$–current signal IL" is smaller than "(control signal $I_{cntl}$–current signal IL)a", "control signal $I_{cntl}$–current signal IL" becomes smaller than "ramp signal Ramp3+ramp signal Ramp11" before the time T11, so that a reset pulse is generated at this timing. If "control signal $I_{cntl}$–current signal IL" is larger than "(control signal $I_{cntl}$–current signal IL)b", "control signal $I_{cntl}$–current signal IL" can not be smaller than "ramp signal Ramp3+ramp signal Ramp11" in the nth cycle, and a reset pulse is generated on and after an (n+1)th cycle. Accordingly, the generation of a reset pulse on the nth cycle of the ramp signal generating circuit 3 always arises between the times T12 and T13. Here, the time T12 indicates the timing at which "ramp signal Ramp3+ramp signal Ramp11" becomes larger than "control signal $I_{cntl}$–current signal IL" on the condition that "control signal $I_{cntl}$–current signal IL" is equal to "(control signal $I_{cntl}$–current signal IL)a".

If "ramp signal Ramp3+ramp signal Ramp11" becomes larger than "control signal $I_{cntl}$–current signal IL", "ramp signal Ramp11" is reset as described above. Therefore, "ramp signal Ramp3+ramp signal Ramp11" actually drops to the level of the ramp signal Ramp3 at that timing. However, since FIG. 8 is a schematic diagram for explaining the timing at which "ramp signal Ramp3+ramp signal Ramp11" becomes larger than "control signal $I_{cntl}$–current signal IL", "ramp signal Ramp11" and "ramp signal Ramp3" do not represent actual values.

On the above described nth cycle, the switch S1 is in the ON state between the times T11 and T12, and in the OFF state between the times T12 and T13. Here, the timing at which the switch S1 is turned from the ON to the OFF state is immediately before the termination of the nth cycle. Accordingly, the duty of the nth cycle becomes relatively large.

Figure 9:
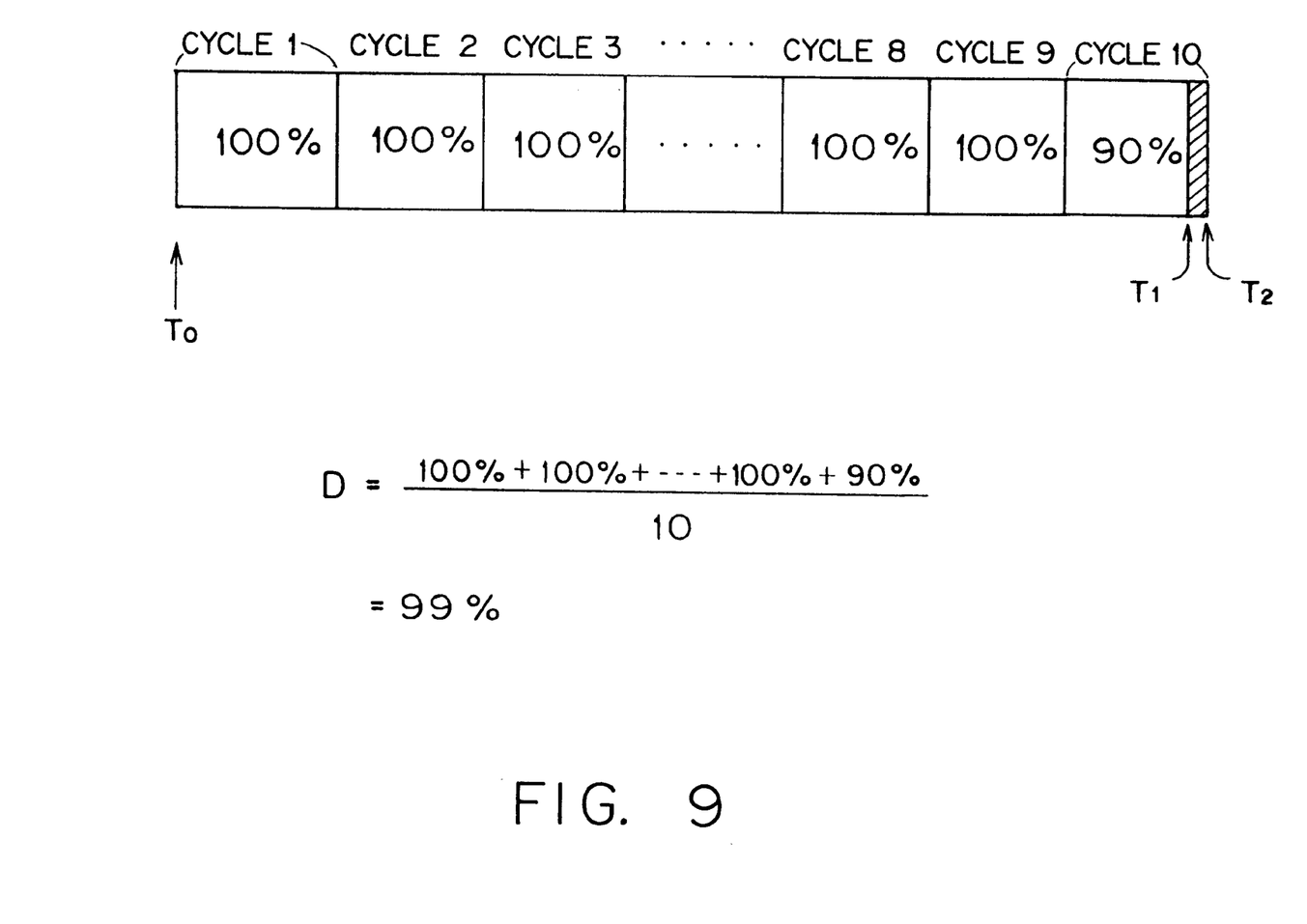
FIG. 9 exemplifies a calculation of an average duty.

Furthermore, "ramp signal Ramp3+ramp signal Ramp11" is always smaller than "control signal $I_{cntl}$–current signal IL" at and after the time T0 shown in FIG. 6, on the respective cycles before the nth cycle of the ramp signal generating circuit 3. Namely, the switch S1 remains in the ON state during this time period, and the duty of each cycle within this time period is 100 percent. Therefore, the average duty between the times T0 and T2 shown in FIG. 6 is calculated to be 99 percent as shown in FIG. 9, assuming that a reset pulse is generated on the 10th cycle of the ramp signal generating circuit 3, which is counted from the time T0, and that the duty of the 10th cycle is 90 percent.

The reason why the average duty can be a value close to 100 percent in the above provided calculation example is mainly that the duty of the 10th cycle of the ramp signal generating circuit 3 is relatively a large value in addition to that the duties of the 1st through the 9th cycles are 100 percent. The reason that the duty of the 10th cycle becomes the large value is as explained by referring to FIG. 8.

The DC/DC converter according to this preferred embodiment employs an nMOS transistor as a switch S1, and comprises a boost capacitor CB for starting up the nMOS transistor. As described above, the boost capacitor CB is charged when the switches S1 and S2 are respectively OFF and ON, and is gradually discharged when the switch S1 is ON. Accordingly, if the switch S1 remains in the ON state during a predetermined time period or longer, the voltage of the boost capacitor CB goes down. Consequently, the driver D1 cannot hold the switch S1 ON.

The DC/DC converter according to this preferred embodiment is designed to prevent such a situation. Specifically, the capacity of the boost capacitor CB, the electric current that the driver D1 draws from the boost capacitor CB, the speed at which the ramp signal Ramp11 rises, an output voltage to be kept, etc. are suitably set.

The time period (allowable ON time) from when the boost capacitor CB is fully charged until when the voltage of the boost capacitor CB drops to the minimum voltage required to hold the switch S1 ON as a result of the operation that the driver D1 performs to hold the switch S1 ON, can be calculated beforehand. Additionally, the maximum amount of the time period (maximum ON time) from when the switch S1 is turned from the OFF to the ON state till when a reset pulse is generated can be regulated based on the rising speed of the ramp signal Ramp11. Accordingly, if the maximum ON time is designed to be shorter than the above described allowable ON time, the driver D1 always drives the switch S1 according to the state of the latch circuit 5. This is because the voltage of the boost capacitor CB never drop to the minimum voltage required to hold the switch S1 ON, as shown in FIG. 6.

Figure 10:
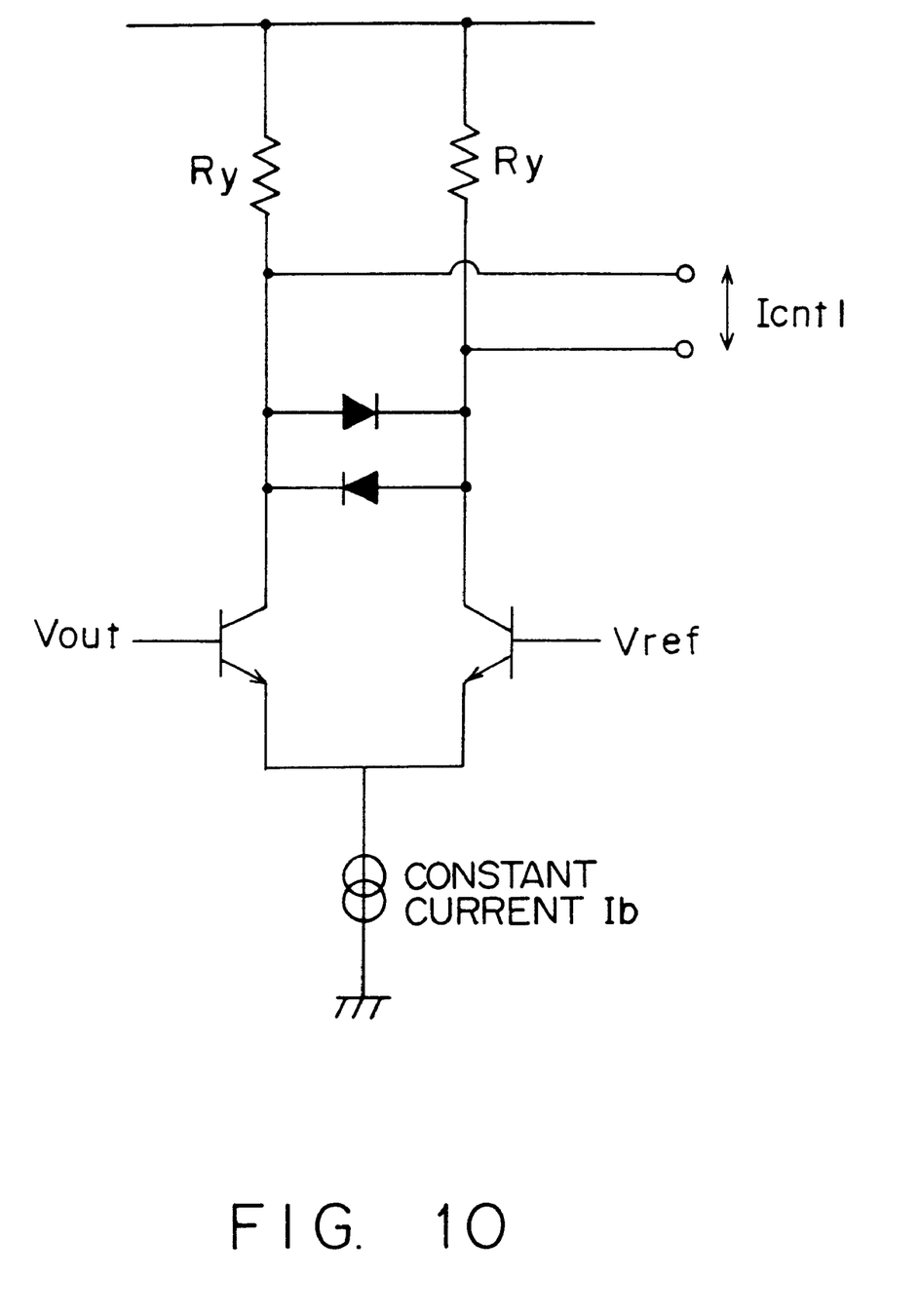
FIG. 10 shows an example of a feedback amplifier comprising a clamp capability.

Furthermore, the DC/DC converter having the above described configuration may have a capability for clamping the output level (the value of the control signal $I_{cntl}$) of the feedback amplifier 1 so as not to exceed a predetermined value. One example of a feedback amplifier having the clamping capability is illustrated in FIG. 10. In this example, the maximum value of the output level is limited to a voltage equal to or lower than the forward voltage of the diode.

With the introduction of the above described capabilities, the comparator 12 surely generates a reset pulse within a predetermined time period in consideration of the phenomenon that the ramp signal Ramp11 gradually rises while the switch S1 is ON. The switches S1 and S2 are respectively turned off and turned on with this reset pulse, so that the boost capacitor $C_x$ is sure to be charged. That is, the driver D1 can always drive the switch S1 according to the state of the latch circuit 5.

By the way, the delay time of the operation of each circuit is not 0 in the DC/DC converter having the above described configuration. Accordingly, for example, if the time period from when the comparator 12 generates a reset pulse till when the oscillator 2 generates a set pulse is short, the behavior of the latch circuit 5 becomes unstable. As a result, the switches S1 and S1 cannot possibly be driven. Such a situation occurs, for example, when the interval between the times T12 and T13 is short in FIG. 8. Explained below is the configuration for preventing such a situation.

Figure 11A:
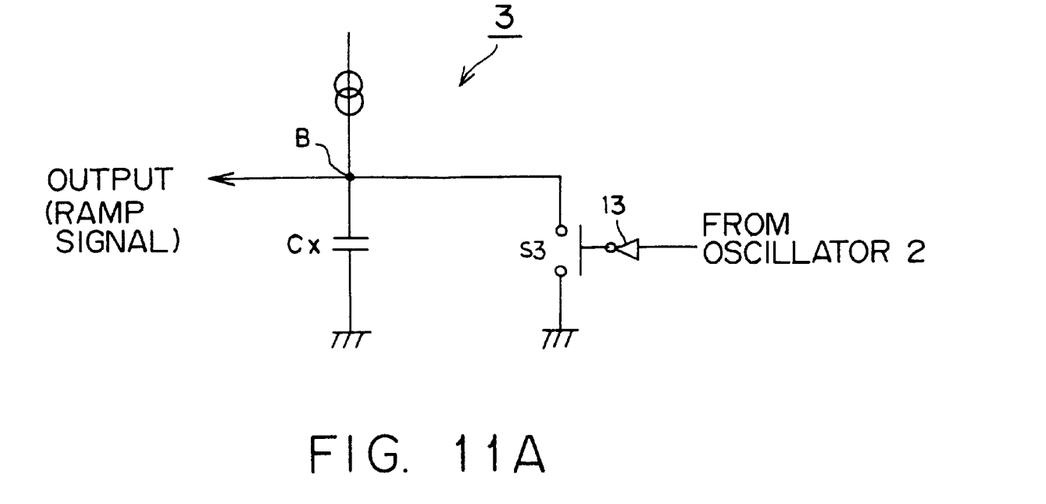
FIG. 11A is a circuit diagram showing the ramp signal generating circuit.
Figure 11B:
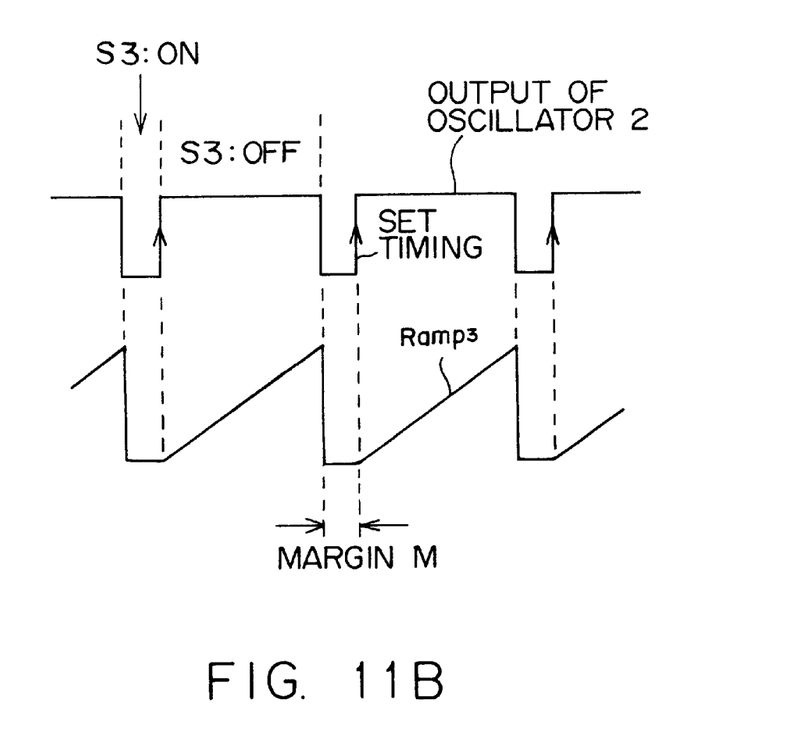
FIG. 11B is a schematic diagram showing the input and the output of the ramp signal generating circuit shown in FIG. 11A.

FIG. 11A is a circuit diagram showing the configuration of the ramp signal generating circuit 3 for preventing the above described situation. A switch S3 is, for example, a transistor. An inverter 13 is connected to a control terminal of the switch S3 so that the switch S3 is turned off if the pulse signal from the oscillator 2 is H, and is turned on if the pulse signal is L as shown in FIG. 11B. While the switch S3 is in the OFF state, the capacitor $C_x$ is gradually charged. In the meantime, while the switch S3 is in the ON state, the capacitor $C_x$ is discharged by the electric current flowing via the switch S3. Therefore, assuming that the resistance of the path reaching from the node B to the ground via the switch S3 is 0 in the above described circuit, the ramp signal Ramp3 is driven to the electric potential of the ground on the falling edge of the pulse signal from the oscillator 2. This electric potential is sure to be held until the timing at which the latch circuit 5 is set. Namely, the ramp signal Ramp3 is sure to be held to the electric potential of the ground during a predetermined time period immediately before the latch circuit 5 is set. As described above, there is always a lag between the timing at which the ramp signal Ramp3 is started to be discharged and the timing at which the latch circuit 5 is set.

The latch circuit 5 is set on the rising edge of the pulse signal from the oscillator 2. Additionally, the reset pulse for the latch circuit 5 is generated immediately before the peak timing of the ramp signal Ramp3, as explained by referring to FIG. 8. That is, at least a margin M is secured from when the latch circuit 5 is reset till when it is set by the next pulse signal. The margin M is, for example, a time period during which the ramp signal Ramp3 surely holds the ground level, and is set to a time longer than the switching times of the switches S1 and S2.

Additionally, according to the above described preferred embodiment, the ramp signal Ramp3 is generated in synchronization with the pulse signal from the oscillator 2. However, the ramp signal Ramp3 may be drop to the ground level until the reception of the next set pulse, when a reset pulse is generated. This operation is implemented as follows: the output of the comparator 12 is input to the ramp signal generating circuit 3, which generates its output based on the input signal and the pulse signal from the oscillator 2. Such a configuration contributes to the capability for preventing a malfunction.

Furthermore, the above described DC/DC converter may have a capability for preventing the set pulse from the oscillator 2 from being supplied to the latch circuit 5 when an output voltage $V_{out}$ becomes higher than a voltage value to be kept. This capability is implemented, for example, by the gate circuit arranged at the output of the oscillator 2, and by the circuit for generating a signal which closes the gate circuit when the output voltage $V_{out}$ exceeds the voltage value to be kept.

Still further, the above described preferred embodiment comprises two ramp signal generating circuits. However, the ramp signal generating circuit 3 among these two is not a prerequisite for implementing the operations which characterizes the present invention. However, it must be remembered that if the ramp signal generating circuit 3 is not arranged, oscillation can possibly occur in a feedback system for controlling the output voltage $V_{out}$.

Still further, in the above described preferred embodiment, the configuration where the output voltage of the DC/DC converter is controlled by a PWM. However, the present invention may be applied to the configuration where the output voltage is controlled by a PFM. For the configuration controlled by the PFM, the oscillator 2 and the ramp signal generating circuit 3 are not required in FIG. 4, and the output of the comparator 12 is input to a one-shot off time circuit, which holds the switch S1 in the OFF state during a predetermined time period upon receipt of the reset pulse from the comparator 12.

According to the present invention, in the DC/DC converter having the capacity for driving a switch arranged between an input power source and a load, the switch can be held ON within a range where the capacity is not discharged, so that a large duty can be obtained if the difference between a supplied input voltage and an output voltage to be kept is small, and the minimum value of the input voltage required for generating the output voltage to be held becomes smaller.

What is claimed is:

1. A DC/DC converter, which has a switch and an inductor connected to the switch, for generating a predetermined output voltage from a supplied input voltage, comprising:

a control signal generating circuit which generates a control signal based on a difference between an output voltage or a voltage proportional to the output voltage and a reference voltage;

a detecting circuit which detects an inductor current flowing through the inductor;

an oscillator which generates a signal of a predetermined cycle;

a first comparing signal generating circuit which generates a first comparing signal that synchronizes with the signal of the predetermined cycle;

a latch circuit which selectively holds either a set state or a reset state;

a driving circuit which drives the switch based on a state held by the latch circuit;

a capacitor which stores an electric charge which is used when said driving circuit holds the switch ON;

a second comparing signal generating circuit which generates a second comparing signal based on the state held by said latch circuit; and a reset signal generating circuit which generates a reset signal based on the control signal, the inductor current, the first comparing signal, and the second comparing signal, wherein said latch circuit is set by the signal of the predetermined cycle, and is reset by the reset signal.

2. The DC/DC converter according to claim 1, wherein said switch is a semiconductor switching element of an n-type.

3. The DC/DC converter according to claim 1, wherein the second comparing signal is a signal which rises or falls as time elapses, while said latch circuit holds the set state.

4. The DC/DC converter according to claim 3, wherein said reset signal generating circuit generates a reset signal if the total of levels of a signal representing the inductor current, the first comparing signal, and the second comparing signal becomes higher or lower than a level of the control signal.

5. The DC/DC converter according to claim 1, wherein the first and the second comparing signals are respective ramp signals that include a time period during which the first or the second signal almost linearly rises or falls with time.

6. The DC/DC converter according to claim 1, wherein a cycle of the second comparing signal is shorter than a time period until said capacitor drops to a minimum voltage required to hold the switch ON.

7. The DC/DC converter according to claim 1, wherein said control signal generating circuit clamps the control signal so that the control signal does not become higher than a predetermined level.

8. The DC/DC converter according to claim 1, further comprising:

a holding circuit which holds the first comparing signal to a predetermined level during a predetermined time period or longer, which is required from when the reset signal is input to said latch circuit until when a signal for setting said latch circuit is input.

9. The DC/DC converter according to claim 8, wherein said holding circuit includes a short circuit for preventing a ramp-up of the first comparing signal within a time period from when the reset signal is input to said latch circuit till when the signal for setting said latch circuit is input.

10. A DC/DC converter, which has a switch and an inductor connected to the switch, for generating a predetermined output voltage from a supplied input voltage, comprising:

control signal generating means for generating a control signal based on a difference between an output voltage or a voltage proportional to the output voltage and a reference voltage;

detecting means for detecting an inductor current flowing through the inductor;

oscillating means for generating a signal of a predetermined cycle;

first comparing signal generating means for generating a first comparing signal that synchronizes with the signal of the predetermined cycle;

latching means for selectively holding either a set state or a reset state;

driving means for driving the switch based on a state held by said latching means;

a capacitor for storing an electric charge which is used when said driving circuit holds the switch ON;

second comparing signal generating means for generating a second comparing signal based on the state held by said latching means; and reset signal generating means for generating a reset signal based on the control signal, the inductor current, the first comparing signal, and the second comparing signal, wherein said latching means is set by the signal of the predetermined cycle, and is reset by the reset signal.

11. A method for controlling a DC/DC converter which has a switch and an inductor connected to the switch and generates a predetermined output voltage from a supplied input voltage, comprising the steps of:

generating a control signal based on a difference between an output voltage or a voltage proportional to the output voltage and a reference voltage;

detecting an inductor current flowing through the inductor;

generating a signal of a predetermined cycle;

generating a first comparing signal that synchronizes with the signal of the predetermined cycle;

selectively holding either a set state or a reset state by using a latch circuit;

driving the switch based on a state held by the latch circuit;

storing an electric charge which is used when the switch is held ON;

generating a second comparing signal based on the state held by the latch circuit;

generating a reset signal based on the control signal, the inductor current, the first comparing signal, and the second comparing signal; and setting the latch circuit by the signal of the predetermined cycle, and resetting the latch circuit by the reset signal.

12. A DC/DC converter, which has a switch and an inductor connected to the switch, for generating a predetermined output voltage from a supplied input voltage by controlling an OFF/ON state of the switch, comprising:

a control signal generating circuit which generates a control signal based on a difference between an output voltage or a voltage proportional to the output voltage and a reference voltage;

a reset signal generating circuit which generates a reset signal when a level of a signal corresponding to an inductor current flowing through the inductor becomes higher than a level of the control signal;

a latch circuit which is set by a signal of a predetermined cycle and is reset by the reset signal;

a driving circuit which drives the switch based on a state held by said latch circuit;

a capacitor which stores an electric charge which is used when said driving circuit holds the switch ON; and a correcting circuit which generates a correcting signal which rises with time while said latch circuit is in a set state, and for correcting the signal corresponding to the inductor current with the correcting signal.

13. A DC/DC converter, which has a switch and an inductor connected to the switch, for generating a predetermined output voltage from a supplied input voltage by controlling an OFF/ON state of the switch, comprising:

control signal generating means for generating a control signal based on a difference between an output voltage or a voltage proportional to the output voltage and a reference voltage;

reset signal generating means for generating a reset signal when a level of a signal corresponding to an inductor current flowing through the inductor becomes higher than a level of the control signal;

latching means for being set by a signal of a predetermined cycle and being reset by the reset signal;

driving means for driving the switch based on a state held by said latching means;

a capacitor for storing an electric charge which is used when said driving means holds the switch ON; and correcting means for generating a correcting signal which rises with time while said latching means is in a set state, and for correcting the signal corresponding to the inductor current with the correcting signal.

14. A method for controlling a DC/DC converter which has a switch and an inductor connected to the switch and generates a predetermined output voltage from a supplied input voltage by controlling an OFF/ON state of the switch, comprising the steps of:

generating a control signal based on a difference between an output voltage or a voltage proportional to the output voltage and a reference voltage;

generating a reset signal when a level of a signal corresponding to an inductor current flowing through the inductor becomes higher than a level of the control signal;

driving the switch based on a state held by a latch circuit which is set by a signal of a predetermined cycle and is reset by the reset signal;

storing an electric charge which is used when the switch is held ON by using a capacitor; and generating a correcting signal which rises with time while the latch circuit is in a set state, and correcting the signal corresponding to the inductor current with the correcting signal.

* * * * *